Figure 1:
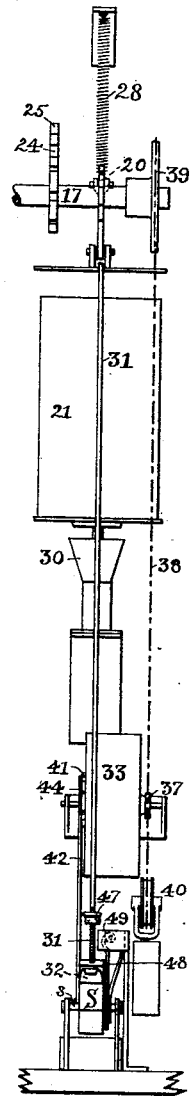

(No Model.)

H. EDMUNDS.
MECHANISM FOR CHANGING ELECTRIC CIRCUITS, &c.

No. 393,146. Patented Nov. 20, 1888.

WITNESSES:
Geo. G. Penney.
H. O. Dorsey.

INVENTOR.
Henry Edmunds
by H. Pollok
his attorney.

UNITED STATES PATENT OFFICE.

HENRY EDMUNDS, OF LONDON, ENGLAND.

MECHANISM FOR CHANGING ELECTRIC CIRCUITS, &c.

SPECIFICATION forming part of Letters Patent No. 393,146, dated November 20, 1888.

Application filed July 19, 1888. Serial No. 280,371. (No model.) Patented in England June 15, 1887, No. 8,641.

*To all whom it may concern:*

Be it known that I, HENRY EDMUNDS, of London, England, have invented a new and useful Improvement in Mechanism for Changing Electric Circuits and Performing other Operations at Regular Intervals, which has been patented to me in Great Britain by Patent No. 8,641, dated June 15, 1887, and which improvement is fully set forth in the following specification.

This invention has reference to apparatus for performing at stated and regular intervals operations such as the changing of electrical circuits, and has for its object the construction of an apparatus which will perform such operations in a reliable and accurate manner, and not be likely to get out of order. In my applications for patents, No. 277,712, filed June 21, 1883, and No. 280,019, filed July 16, 1888, I have described such an apparatus in connection with a system of electrical distribution, in which secondary batteries are transferred from one circuit to another at regular intervals; but such apparatus is not specifically claimed therein, it being obvious that its use is not limited to such a system, or even to changing circuits generally, but that it is applicable to the performance of other operations.

In carrying out my invention I employ a closed hollow cylinder or drum divided into compartments by partitions radiating from the axis of the cylinder or drum, there being small openings through the partitions, so that liquid in one compartment can flow slowly into the next and find its level. This drum is mounted on a shaft driven by a suitable motor—such as a spring or weight—the liquid in the drum serving to regulate the speed at which the shaft rotates. The spring or weight is wound up at intervals by the motive agent, which is periodically called into action by the revolution of said drum or a part connected therewith. For example, once or oftener during each revolution a circuit-closer may be actuated by said drum to close the circuit of a solenoid, which thereupon attracts its armature. This motion of the armature thus periodically obtained may be utilized, first, to perform the operations which it is the function of the apparatus to perform, and, second, to wind up the spring or weight, so that it may continue to rotate the drum. The armature of the solenoid is preferably connected with a shaft, to which it imparts an intermittent rotation, and by the motion of this shaft the circuit changes or other operations are performed. The spring or weight on the shaft of the time-drum may be wound up by means of a drive-chain passing over a sprocket-wheel on the shaft actuated by said armature.

Figure 2:
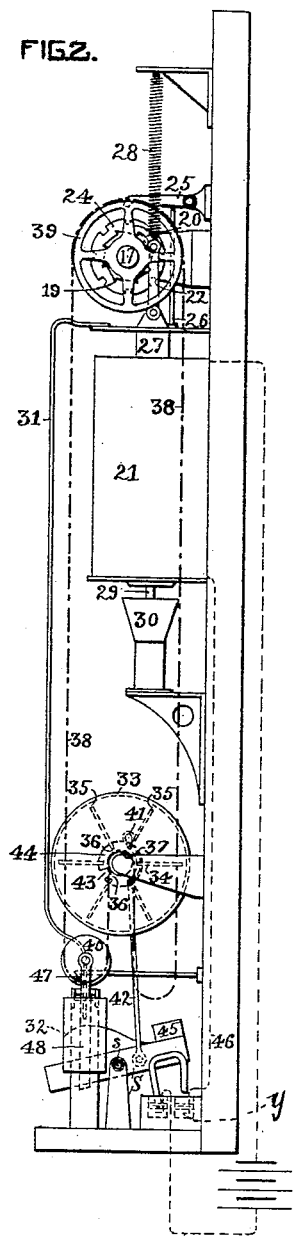

In the accompanying drawings, which form part of this specification, Figure 1 is a side elevation of a timing mechanism constructed in accordance with the invention, and Fig. 2 a front view of the same.

The apparatus is, for the purposes of explanation, shown as arranged to rotate intermittently a shaft, 17, which, by ordinary gearing or other connections, can be made to operate electrical switches or circuit-changers, as described in my aforesaid applications, or to perform any other desired operations. The closed drum 33 is divided by partitions 34 into a series of chambers or compartments, and the drum is partly filled with any suitable liquid. Each partition has small apertures 35 near the periphery of the drum, and others, 36, near its axis, the former being to allow the liquid to flow from one chamber to the other as the drum rotates and the latter to allow the air displaced by the motions of the liquid to pass into adjacent compartments. The shaft of this drum is driven, in the apparatus shown, by a weighted pulley, 40, hung in the loop of an endless drive-chain, 38, which passes around a small sprocket-wheel, 37, on the shaft of the time-drum and around a large sprocket-wheel, 39, on the main shaft 17, the slack of chain 38 being carried down to such a level that it may have to rise to wheel 37, and thus have sufficient circumferential contact with it. The weight 40 turns drum 33 until the weight of the liquid therein balances the weight 40, and then the latter turns slowly as the liquid trickles through the holes 35. This motion would continue until the weight should run down; but the drum is periodically arrested by a rod, 42, carrying a roller, 41, which runs on the edge of a disk, 44, on the axis of drum 33, and at the proper moment drops into a recess or notch, 43, in said disk. Rod 42 is pivoted at its lower end to a tipping-lever, S, turning on a center, s, and when the roller 41 falls into recess 43 said lever is turned on its center by weight 45 and closes an electric circuit at y. This circuit includes the solenoid 21, which thereby becomes energized and attracts its armature 27 against the pull of spring 28. A pawl, 20, is connected to armature 27 by link 22, said pawl engaging a ratchet-disk, 19, on shaft 17, so that the latter is rotated through an arc of a certain length by the motion of armature 27. To insure that the shaft 17 shall not move more than the desired distance at each movement of the armature, a banking-piece, 25, is provided, which makes engagement with a notched disk, 24. A pin, 26, carried by the armature, keeps banking-piece 25 out of contact with said disk; but when the armature descends it drops onto said disk and arrests shaft 17 by falling into the first notch. These notches are, of course, equidistant. By these means the shaft 17 receives a regular intermittent motion controlled by the time-drum 33, which motion may be utilized for any desired purpose; but the motion of the shaft 17 also winds up the weight 40 by the rotation of the sprocket-wheel 39. The power is therefore available to rotate the time-drum as soon as the latter is released by a roller, 41. In the apparatus shown this is accomplished by the rod 31, carried by the armature, and which in descending comes into contact with the spring 32 and compresses it, but at first without tilting lever S, which is upheld by a spring-detent, 48. When, however, the nut 47 on rod 31 pushes aside the detent 48, the oscillating lever S is returned to the position shown in the drawings, breaking the circuit of magnet 21 and lifting the roller 41 out of the recess 43, and the drum 33 turns again under the influence of weight 40. These operations are repeated indefinitely.

The object of interposing spring 32 between the rod 31 and lever S is to cause said lever to be returned to its former position by a quick motion, this being accomplished by the tension of spring 32 as soon as it is released.

In order to prevent too quick a stroke of armature 27, a piston, 29, is attached to its lower end and works in a dash-pot, 30.

Modifications could obviously be made in the details of construction without departing from the spirit of the invention. For example, although I have shown and described a solenoid as part of the apparatus, it will be understood that the invention is not limited thereto, but that other forms of electro-magnetic devices could be substituted therefor.

Having now fully described my said invention and the manner in which the same is or may be carried into effect, what I claim is—

1. The combination, with a shaft and motor for driving the same, of the drum on said shaft provided with perforated partitions and partly filled with liquid, an electro-magnet, an armature therefor, and a circuit-closer operated by the rotation of said drum to close the circuit of said magnet, substantially as described.

2. The combination, with a shaft and motor (such as a spring or weight) for driving the same, of a time-drum divided into compartments by perforated partitions, a solenoid in an electric circuit, a circuit-closer therefor operated periodically by the rotation of said drum, an armature for said magnet, and connections between said armature and motor, whereby the latter is wound up by the motions of the former, substantially as described.

3. The combination of a shaft driven by a suitable motor, a time-drum for regulating the speed of said shaft, said drum being provided with perforated partitions and partly filled with liquid, an electro-magnet whose circuit is opened and closed by the rotation of said drum, a shaft connected with the armature of said magnet so as to be driven thereby, and connections between said shaft and that of the motor for winding up the latter, substantially as described.

4. The combination of the time-drum, the drive-chain passing over a sprocket-wheel on the shaft of said drum, the electro-magnet, and the armature for imparting motion to a shaft when the circuit of said magnet is periodically closed by the action of said time-drum, and a sprocket-wheel on the latter shaft, also engaged by said chain, whereby the weight is wound up at each reciprocation of said armature, substantially as described.

5. The combination of a shaft, an electro-magnet, its armature connected with said shaft, so as to turn the same when attracted by said magnet, an electric circuit including said magnet, a shaft driven by a suitable motor, a notched disk on said shaft, a time-drum for regulating the speed of rotation of said shaft, a circuit-closer propelling and closing the circuit of said magnet, a rod for operating said circuit-closer, and a roller on the end of said rod running on said notched disk, substantially as described.

6. The combination of an electro-magnet and its armature, a circuit including said magnet, a shaft carrying a regulating time-drum and driven by a suitable motor, a tilting lever carrying contacts for closing said circuit, a rod controlled by a device on said shaft for actuating said lever to close said circuit, thereby causing said magnet to attract its armature, and another rod connected with said armature for actuating said tilting lever to break said circuit when the armature is attracted, substantially as described.

In testimony whereof I have signed this specification in the presence of two subscribing witnesses.

HENRY EDMUNDS.

Witnesses:
PHILIP MAURO,
C. J. HEDRICK.